(12) United States Patent
Chartier et al.

(10) Patent No.: US 9,778,779 B2
(45) Date of Patent: Oct. 3, 2017

(54) DEVICE AND METHOD FOR VISUAL SHARING OF DATA

(71) Applicant: IMMERSION, Bordeaux (FR)

(72) Inventors: Christophe Chartier, Bordeaux (FR); Jean-Baptiste De La Riviere, Bordeaux (FR)

(73) Assignee: IMMERSION, Bordeaux (FR)

( * ) Notice: Subject to any disclaimer, the term of this patent is extended or adjusted under 35 U.S.C. 154(b) by 119 days.

(21) Appl. No.: 14/646,094

(22) PCT Filed: Nov. 20, 2013

(86) PCT No.: PCT/EP2013/074320
§ 371 (c)(1),
(2) Date: May 20, 2015

(87) PCT Pub. No.: WO2014/079902
PCT Pub. Date: May 30, 2014

(65) Prior Publication Data
US 2015/0293641 A1    Oct. 15, 2015

(30) Foreign Application Priority Data

Nov. 20, 2012  (FR) ..................... 12 61021

(51) Int. Cl.
| | |
|---|---|
| *G06F 3/041* | (2006.01) |
| *A47B 21/007* | (2006.01) |
| *G06F 3/0488* | (2013.01) |
| *G06F 1/16* | (2006.01) |
| *G06F 3/0481* | (2013.01) |
| *G06F 3/0484* | (2013.01) |

(52) U.S. Cl.
CPC .......... *G06F 3/0416* (2013.01); *A47B 21/007* (2013.01); *G06F 1/1601* (2013.01); *G06F 3/0481* (2013.01); *G06F 3/0484* (2013.01); *G06F 3/0488* (2013.01)

(58) Field of Classification Search
None
See application file for complete search history.

(56) References Cited

U.S. PATENT DOCUMENTS

| | | | |
|---|---|---|---|
| 8,379,098 B2* | 2/2013 | Rottler ................ | G06F 3/04883 348/211.6 |
| 2007/0064004 A1 | 3/2007 | Bonner et al. | |
| 2008/0198138 A1* | 8/2008 | McFarlane ............ | G06F 3/0421 345/173 |

(Continued)

FOREIGN PATENT DOCUMENTS

EP    2267595    12/2010

OTHER PUBLICATIONS

International Search Report dated Jul. 8, 2014, corresponding to PCT/EP2013/074320.

(Continued)

*Primary Examiner* — Nicholas Lee
(74) *Attorney, Agent, or Firm* — Young & Thompson

(57) ABSTRACT

An assembly with a device (10) for visual sharing of data includes processing elements and data storage elements, a touch screen (12), and network connection elements allowing a connection with one or more computers (14), for displaying on the sharing device (10) instantaneous images obtained from connected computers.

20 Claims, 3 Drawing Sheets

(56) References Cited

U.S. PATENT DOCUMENTS

Figure 1:
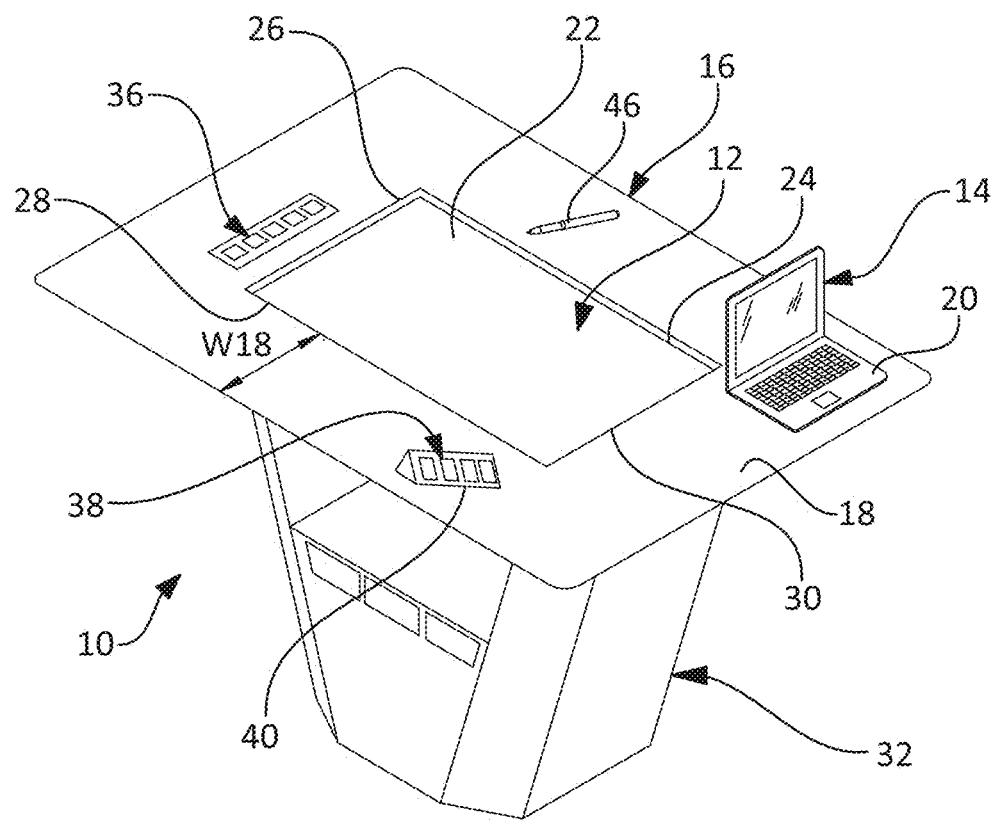

2011/0069019 A1\* 3/2011 Carpendale ........... G06F 3/0425
                                                                         345/173

OTHER PUBLICATIONS

Joseph Starr; "The Elements Media T1 Visions Social Touchscreen by Agati"; Mar. 8, 2012; XP002699707.
Agati Furniture: "Elements Media T1VISIONS Social Touchscreen Solutions"; 2012; XP002699708.

\* cited by examiner

DEVICE AND METHOD FOR VISUAL SHARING OF DATA

TECHNICAL FIELD

This invention relates to a device for visual sharing of data and to the method of sharing that is associated with it.

More specifically, the invention relates to a local sharing of data, i.e., a sharing of data among various individuals attending a meeting, in particular in the same location.

Actually, within an industrial, scientific or educational context, it is common that a group of individuals meets in the same location for discussing one or more subjects.

PRIOR ART

Today, it is common to use a computer for presenting data to various individuals from the same screen.

The data that are presented can be made available to the individuals in attendance, at the time or subsequently, in hard copy or on a digital medium such as a notebook computer or a touch tablet.

The data are thus shared, and each individual can annotate them or modify them on his own medium with additional data, for example obtained from remarks and comments from the various individuals in attendance, a solution that proves tedious and impractical when the initial data are to be augmented.

It is also common during collaborative work meetings to have to share information recorded in various specific formats, for example formats suited to various computer-assisted design (CAD) software. In these cases, the local sharing of data calls for a computer that is able to read all of the various formats for centralizing the data to be shared and to display them on the sharing screen.

This method, on the one hand, lacks speed and flexibility, and, on the other hand, proves costly, with most of this creation software having licenses for their use that require payment.

In addition, these solutions require the transfers of bulky files and high-performing material resources for simultaneously launching the necessary applications if it is desired to avoid a loss of time by launching an application with each opening of a file. Another drawback of the known methods relates to the confidentiality of the data provided by each member of the team who is not protected, in particular when a file is copied over onto a third-party computer for displaying results there.

Actually, total access to the data files is to be authorized so that the computer that centralizes the data can exploit them.

Consequently, this second method of local sharing of data is not optimal.

In the state of the art, sharing means also exist that make it possible to share a video stream from a computer in real time over a local network.

Although these sharing means provide a better solution than the preceding sharing methods relative to the flexibility and the monitoring of access to data, it is difficult, and even impossible, to share in real time the video streams, and therefore the data, obtained from several computers.

Actually, despite the increasing performance levels offered by the local networks, the video streams are growing larger and larger because of the enhancement in resolution of the screens, and the number of shared video streams is necessarily to be limited by the maximum bandwidth of the network that is used.

Even when a single video stream is shared, latency periods in the display on the screen of the destination computer can be noted, with the speed of transfer of a video stream by a local network being slower than that of a transfer by simple video cable.

Also, these sharing means in general do not make it possible to display simultaneously, and side-by-side on the same screen, data obtained from various computers or miscellaneous sources.

Solutions that make use of interactive desks, most often touch desks, making it possible to display digital information, also exist.

These solutions, however, suffer from the same defects as the other methods that are cited. Actually, their capacities for transmission, processing and recovery of information are slow and not very flexible.

In general, the data are to pass by the file copy to mass storage peripherals and their new copy on the desk. No means is proposed for accelerating the exchange in real time of the information that is accessible on a computer terminal.

Although they make it possible to display and to manipulate several items of digital information on a single surface, these solutions are also limited in the formats, data and exchanges that they can support.

Actually, it is, for example, impossible to add annotations above the set or a sub-set of displayed data, coming from miscellaneous sources and formats, for creating new information enhanced with the expertise of the users.

It is also complicated to duplicate the displayed information so that it is available to each of the users and can be displayed in complete comfort, while ensuring a synchronization of actions of various users for making possible a simultaneous update of each of the duplicated contents. Actually, the existing solutions are concentrated on sending a tag from one user to another, in which case the initial user no longer has the contents available.

Also, the purpose of this invention is to remedy the drawbacks of the prior art.

DISCLOSURE OF THE INVENTION

For this purpose, the invention has as its object an assembly that comprises a device for visual sharing of data and at least one computer, or a terminal incorporating a computer, in which the device for visual sharing of data comprises processing means and data storage means, a touch screen, and network connection means allowing a connection with one or more computers or terminals incorporating a computer, with the device comprising a frame with at least one flange that is adjacent to the touch screen and on which can be placed one or more computers or terminals incorporating a computer without them infringing upon the surface of the touch screen, with the at least one computer or terminal incorporating a computer being connected to the network to which the device belongs.

In the assembly, the at least one computer, or terminal incorporating a computer, comprises client software, active when this computer, or terminal incorporating a computer, is connected by network to the device for visual sharing of data, the client software comprising a series of instructions, which implements the transmission via the network to the device for visual sharing of data of an instantaneous image, i.e., a representation of data, in text form or in graphic form, of the interpretation of said data, of some or all of a screen of the at least one computer or terminal incorporating a computer following a predefined action of capture on said computer, or terminal incorporating a computer.

In addition, in the assembly, the system comprises software implementing the storage of an instantaneous image transmitted by the at least one computer, or terminal incorporating a computer, and jointly the display on the touch screen, of at least one tag of the stored instantaneous image, with said software comprising an assembly of logic units comprising the capacity for interpreting actions of an operator on the surface (22) of the touch screen for acting on the displayed tag.

Using the combination of such a flange and network connection means, the device according to the invention makes possible the sharing of data between various individuals, simply and in an intuitive manner, with this sharing being visual with use of the touch screen and making it possible for the individual displaying data to store the selection of data that he is transmitting and the confidentiality of his computer files.

The invention defines instantaneous image as any means of showing, recording, and sharing digital information, regardless of size or format.

This includes, on the one hand, in a conventional way, any digital file that stores data in a given format.

In one embodiment, these data comprise the well-known formats that are JPG, PNG, PDF, DOC, XLS, OBJ, or CATIA.

This also includes the text information that could be copied or entered by the user.

In one embodiment, these data represent a URL or text information that is sufficient by itself or intended to supplement accessible information in another instantaneous image.

Finally, this includes, on the other hand, the capture and the recording of data that are interpreted and/or displayed on the screen of a computer terminal.

In a preferred embodiment, these data are a copy in the form of an image file of all of the pixels displayed on the screen, making it possible to share the contents of the screen of a user at a specific moment.

Advantageously, in this preferred embodiment, this copy in the form of an image file can be accompanied by a set of metadata recording the characteristics of contents that are interpreted and/or displayed at the time of capture of the instantaneous image.

In another embodiment, these data are a video stream that is encoded in real time of a screen display, able to be decoded by the means for processing of the sharing device and thus making it possible to share remotely the animations of the screen of a terminal.

In still another embodiment, these data are a recording in image form of a set of annotations produced above a set of instantaneous images, with the sharing device itself being considered as a computer terminal.

Advantageously, the medium of the set of these instantaneous images makes it possible for the processing means of the invention to take into account in a transparent way any digital information, which can thus be transmitted or displayed either in file form or in screen capture form, or in video screen sharing form.

In one embodiment of the set, the capture of an instantaneous image produced on the computer, or terminal incorporating a computer, comprises metadata that are predefined in the client software resident on said computer, or terminal incorporating a computer, if necessary following a parameterization or an acquisition of data by the user of the computer, or terminal incorporating a computer, associated with the image and transmitted to the system with said captured instantaneous image.

Attributes useful to the information and in particular means of traceability of the information are thus preserved or added to the transmitted information.

In one embodiment, the displayed actions on a tag comprise some or all of: reducing a tag to an icon and displaying the instantaneous image corresponding to a tag; manipulating said instantaneous image; duplicating said instantaneous image; combining a number of instantaneous images received; enhancing said instantaneous image; annotating said instantaneous image; archiving said instantaneous image; returning said instantaneous image, if necessary enhanced, to one or more computers connected in a network with the device.

Thus, it is possible to produce on the touch screen manipulations of images corresponding to information of instantaneous images so as to make of them a visual access that is clearer and more comfortable to the participant at a meeting around the device and to acquire new data relative to these instantaneous images.

In one embodiment, the system comprises at least one physical button connected to the processing means and making it possible for a user to act on the data displayed on the touch screen.

In one embodiment, the processing means are configured in such a way that an action on a virtual button displayed on the touch screen and/or a physical button has the effect of blocking some or all of the interpretations of some or all of the interactions of an operator on some or all of the touch screen.

In one embodiment, the processing means are configured in such a way that an action on a virtual button displayed on the touch screen and/or a physical button has the result of producing a capture of an instantaneous image of data that are interpreted or displayed on the touch screen and of backing up said instantaneous image in the data storage means.

In these embodiments, it is possible to produce quickly and intuitively high-level instructions on the instantaneous images.

In one embodiment, the processing means are configured in such a way that instantaneous images of data captured on the touch screen and backed-up in the data storage means are accessible by an archiving window displayed on the touch screen.

It is thus possible to store traces of actions taken and intermediate stages of a work meeting, for example for the purpose of creating a report.

In one embodiment, the processing means are configured in such a way that an action on a virtual button displayed on the touch screen and/or a physical button has the result of activating, and/or deactivating, annotation functions on some or all of the touch screen.

It is thus possible to protect certain categories of action by activating them or deactivating them, optionally independently for each tag, and even preventing conflicts between actions taken by various participants on linked tags.

In one embodiment, the frame of the device is arranged in the form of a desk into which is integrated the touch screen between four flanges forming a frame with said touch screen, with said frame having a width that is greater than or equal to twenty centimeters, and with said frame preferably comprising sensors for connecting to the local network and/or sensors for power supply for at least one computer or terminal incorporating a computer, preferably as many sensors of each type as work stations provided around the table.

A device is thus obtained that is particularly ergonomic and that combines in a suitable form all of the needs of those participating in a meeting.

The invention also addresses a method for visual sharing of data in which data that have to be shared between several individuals are displayed on a touch screen of a device for visual sharing of data, in particular a device of the invention, starting from data contained in at least one computer or a terminal incorporating a computer, which method for visual sharing of data comprises a preliminary stage of connecting the at least one computer, or terminal incorporating a computer, a recognition stage of said computer, or terminal incorporating a computer, by the device for visual sharing of data and display on a screen of said at least one computer, or terminal incorporating a computer, of data to be shared.

The method then comprises the stages:
- of performing a capture of data to be shared that are present on the computer or the terminal incorporating a computer, or terminal incorporating a computer, previously connected in the form of an instantaneous image;
- of transmitting by the computer or terminal incorporating a computer the instantaneous image of data captured with the device for visual sharing of data via its network connection means;
- of storing said instantaneous image by the device for visual sharing of data, and
- of displaying at least one tag on the touch screen that materializes said instantaneous image on said touch screen of said system for visual sharing of data.

Controlled information on which the participants will be able to work collaboratively is thus exchanged between participants.

In one implementation, the transmission by the computer or terminal incorporating a computer is triggered by at least one click on a virtual button of a client software resident on said computer, or terminal incorporating a computer, or by a drag and drop of a file in a send window of said client software.

The owner of the computer having to transmit an instantaneous image controls the contents and the time of transmission of information carried by the instantaneous image.

In one implementation, the device transmits an instantaneous image of data that is captured on said device for visual sharing of data, via the network connection means, to a computer or terminal incorporating a computer, connected to said network, by at least one click on a tag displayed on the touch screen and identifying said computer, or terminal incorporating a computer, or by a drag and drop of a file in said tag.

It is thus to ensure a simple transmission, in response, of instantaneous images to the various individuals participating in a meeting in a collective or selective manner.

In one implementation, a two-dimensional image or a three-dimensional image is displayed on the touch screen when the instantaneous image that is transmitted by the computer or terminal incorporating a computer corresponds to digital data of a two-dimensional image or a three-dimensional image.

The instantaneous images are thus displayed automatically except when a given metadatum transmitted with the instantaneous image or a parameterization of the system limits this possibility.

In one implementation, when an instantaneous image is shown two or more times by tags displayed on the touch screen, some or all of the interpretations, made by the device on one of said tags, of actions of an operator are reflected on all of the other said tags.

Each participant who uses a tag can therefore follow the work carried out by one of the participants on a tag.

In one implementation, the device—in storage means of said device—stores back-ups of some or all of the images of the touch screen, said back-ups being made periodically at a defined time interval, and/or with each action concurrent with an enhancement of information contained in an instantaneous image and/or on an action of an operator on a virtual or real button.

Thus, losing a piece of information that was only temporarily present on the touch screen and preserving the trace of the proposals are avoided.

Of course, with the network connection means being bidirectional, this sharing method is symmetrical.

Also, in a preferred embodiment, an instantaneous image that is produced from the sharing device can be transmitted, and/or stored, and/or displayed in window form on at least one of the connected computer terminals.

The fact of producing simple instantaneous images of data to be shared and of displaying them on the touch screen in the form of tags makes it possible to eliminate problems linked to the limitation of the bandwidth, to control the given access to these data with other users, to simplify the interactions between the users via the sharing device for facilitating the understanding by the users of data displayed by the touch screen, and also to facilitate the archiving of data shared during a collaborative work meeting.

BRIEF PRESENTATION OF THE FIGURES

Figure 2:
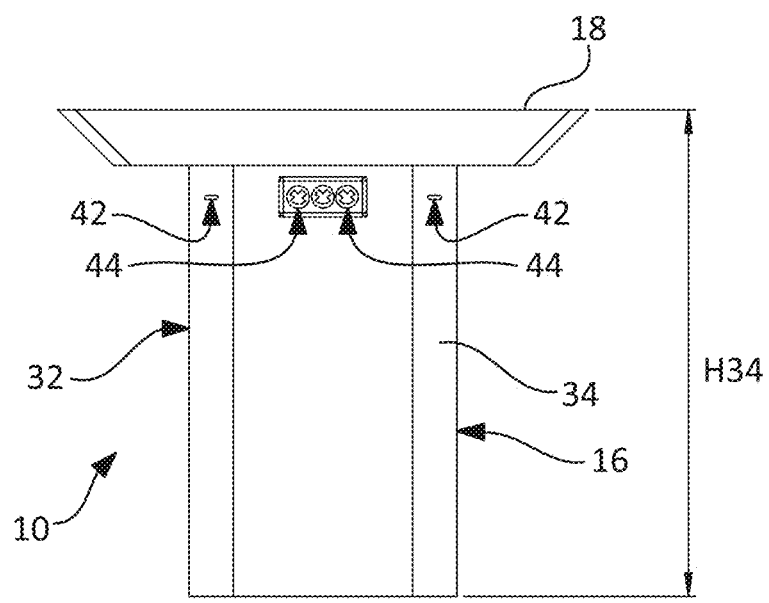

Other characteristics and advantages will emerge from the following description of the invention, a description provided only by way of example, relative to the accompanying drawings in which:

FIG. 1 is a perspective view of a device for visual sharing of data according to the invention, FIG. 2 is a side view of a device for visual sharing of data according to the invention, FIGS. 3 to 10 are various screen captures shown diagrammatically and illustrating the possibilities of sharing data offered by the device and the method for visual sharing of data according to the invention.

DETAILED DISCLOSURE OF AN EMBODIMENT

FIG. 1 diagrammatically exhibits a device 10 for visual sharing of data according to the invention.

The device 10 for visual sharing of data comprises means for processing and means for storing data, a touch screen 12 that is preferably of the "multitouch" type, and network connection means allowing a connection with one or more computers 14.

The processing means include at least one logic unit comprising the capacity for receiving data by the network, interpreting them, displaying them, manipulating them, duplicating them, combining them, enhancing them, annotating them globally or locally, archiving them, and returning them via the network.

In the device of the invention, enhancing and annotating data consists in adding supplemental data to them, for example comments or modifications submitted by the participants at a collaborative work meeting, for modifying at least one appearance thereof.

This sharing device 10 comprises a frame 16 that comprises at least one flange 18 that is adjacent to the touch screen 12 and on which can be placed one or more notebook computers and/or one or more mobile terminals incorporating a computer 20 without encroaching upon the surface 22 of the touch screen.

Preferably, this flange 18 has a width W18 that is greater than or equal to twenty centimeters.

So as to gather various users all around the touch screen 12, the flange 18 surrounds the touch screen 12 on its four sides (24, 26, 28, 30).

In a preferred embodiment whose purpose is to facilitate the collaborative work, the visual sharing device 10 takes the form of a desk 32, with the touch screen 12 and the flange 18 resting horizontally on a base 34, as the side view of the device illustrates in FIG. 2.

Thus, all of the users that are in attendance around the desk 32 can see the data displayed on the touch screen 12 and can perform or follow manipulations of these data produced during a meeting via the touch screen.

The invention defines manipulation as any interaction of a user having an effect on the displayed data, whose objective can be to carry out operations on a tag, whose purpose is to create or to access other contents, or to change its geometric or spatial characteristics that are absolute or relative to other contents or containers, or on the data that it contains, whose purpose is to adjust the representation or the interpretation thereof.

In one embodiment, the operations on the tags comprise moving them on a 2D plane, making them undergo rotations, changing their dimensions, accessing metadata that are associated with them, duplicating them, annotating them, and pointing out or highlighting particular information.

In one embodiment, the operations on the contents of the data are specific to the nature of a manipulated snapshot, and they comprise in particular carrying out a zoom of an image, manipulating a 3D model, or moving within a text document.

Preferably, the base 34 holds the touch screen 12, and the flange 18 has a height H34 that is greater than or equal to 1 meter. Thus, individuals who are standing can participate in the meeting, and simple observers have a better viewpoint on the data that are exchanged.

As a variant, the base 34 can hold the touch screen 12 and the flange 18 at a lower height H34, such as at around 75 cm for forming a standard meeting desk or at around 45 cm for forming a low desk.

Advantageously, the sharing device 10 comprises seats, or stools, placed around the desk 32 and with a suitable height for ensuring the comfort of the users of the device 10.

Advantageously, the base 34 contains means for processing and means for storing data, and integrates network connection means.

So as to facilitate certain manipulations of data displayed on the touch screen 12, in particular by users who are not very accustomed to a touch manipulation, the flange 18 integrates, if necessary, physical buttons 36 making it possible for a user to act on the data displayed on the touch screen 12.

As a variant, physical buttons 38 can be provided on a box 40 that is movable and connected to processing means of the sharing device 10.

In one embodiment, so as to facilitate certain manipulations of the data displayed on the touch screen 12, and in particular for annotating supplemental data associated with the latter, the sharing device 10 comprises an electronic stylus 46 that is suitable for operating with the touch screen 12.

So as to supplement the means for importing data to be shared, and to facilitate the exporting of shared data, digitally or on a physical medium, the visual sharing device 10 comprises sensors 42 for the connection of external peripherals of mass storage, such as, for example, a USB key or an external hard disk, or a printer.

Advantageously, the visual sharing device 10 also comprises power supply sensors 44 for the connection of the computer(s) 20 connected with the sharing device 10.

The sharing device 10 is particularly designed for sharing data from any type of computer or terminal incorporating a more or less powerful computer, in particular notebook computers 20, digital tablets, smartphones, other sharing devices 10 . . . provided that they use network connection means that are compatible with the means for connection of the device 10.

However, the network connection means can also make it possible to connect, if necessary, an office computer, of the "desktop" type, which also uses network connection means.

The connection can be made by cable or by wireless, by radio connection or by infra-red connection, according to the network connection means implemented by the sharing device 10.

Using its network connection means, the sharing device 10 can be connected to the same local network as the other computers 20.

Preferably, the sharing device 10 creates, via its system software and software dedicated to the sharing of data, its own local network, with the users connecting to this local network in a transparent manner using the installation of a module of the sharing software on their computers 20.

This invention also relates to a method for visual sharing of data using the device 10 for visual sharing that was just described.

Figure 3:
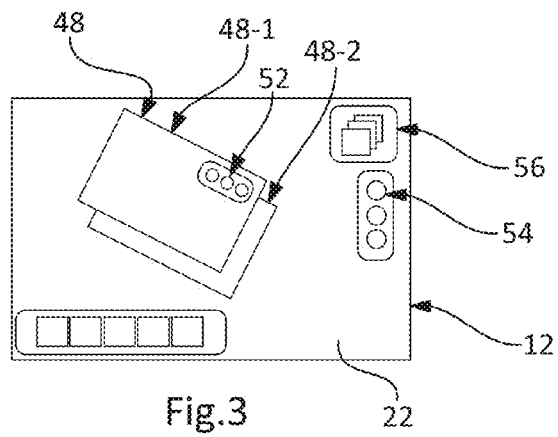

According to the invention, the visual sharing method consists in:

Connecting at least one computer 20 that contains data to be shared by means of the device 10 for sharing via the network connection means;

Carrying out a capture of an instantaneous image of data to be shared that are present on the computer 20 that is connected and accessible from a screen 14 of said computer;

Transmitting this instantaneous image of data to the sharing device 10 via its network connection means, and;

Displaying the instantaneous image of data in the form of a tag 48 on the touch screen 12, as FIG. 3 illustrates.

Within the framework of a collaborative work, various computers or terminals comprising a computer 20 of various users are connected to the sharing device 10 via its network connection means.

In this case, the method makes it possible that captures of instantaneous images of data are carried out on various computers or terminals 20 that are connected, then are transmitted to the sharing device 10 via its network connection means, and then are displayed simultaneously in the form of various tags (48-1, 48-2) on the touch screen 12.

Each instantaneous image, and therefore the contents of each tag (48-1, 48-2), consists of a two-dimensional image or a three-dimensional image of open data to be shared on a computer 20 that is connected to the sharing device 10.

Within the context of the invention, instantaneous image should be understood to mean a representation of digital information that is frozen at a selected moment by an operator.

A priori, an instantaneous image comprises the representation of data that have to be displayed in the form of files meeting a standard. It is possible to act on text information or the representation in graphic form of the interpretation of the data.

An instantaneous image can therefore correspond to any type of digital file, for example the most common files such as those meeting standards identified in the files of the following types: .JPG, .PNG, .PDF, .DOC, .ODT, STEP . . . .

An instantaneous image can also correspond to combinations of files, for example for containing text information that would be copied or entered by a user.

In one embodiment, the data represent a URL or text information that is sufficient by itself or intended to supplement the accessible information in another instantaneous image.

An instantaneous image can result from the capture or the recording of data interpreted and/or displayed on the screen of a computer terminal.

In a preferred embodiment, an instantaneous image corresponds to a set of data forming an image file of some or all of a screen, making it possible to share the contents of the screen of a user at a given time.

Advantageously, in this preferred embodiment, said set of data comprises—in addition to the image file—metadata, generated automatically and/or generated by the user, providing characteristics of the contents interpreted and/or displayed at the time of the capture of the instantaneous image.

In another embodiment, the data correspond to a video stream encoded in real time of a screen display, able to be decoded by the processing means of the sharing device and thus making it possible to share remotely the animations of the screen of a terminal.

In another embodiment, the data correspond to a recording in image form of a set of annotations made above a set of instantaneous images, with the sharing device (10) being considered as a computer terminal.

In this context, an instantaneous image is, for example, a photographic image, by extension a video file, or a screen copy for a two-dimensional image, or, for example, a three-dimensional representation of an object that can be manipulated in a virtual space in three dimensions, such as, for example, an object that is modeled using three-dimensional design software for a three-dimensional instantaneous image.

The invention defines virtual space, in two or three dimensions, as an imaginary environment, in two or three dimensions, which is created by a computer and can be displayed on a screen.

Optionally, a three-dimensional visualization on the touch screen 12 can also be provided using a stereoscopic method, for example.

The various instantaneous images that can be used by the sharing device 10 are created in the first place on the computers 20 that are connected using their system software or programs installed on these computers for creating, modifying, or simply reading the data that are to be shared, or starting from other utility programs.

The various instantaneous images of data on the various connected computers 20 can be carried out in an automatic manner by the installed software, but preferably, the captures of instantaneous images are triggered by the users so as to control the shared contents.

In one preferred embodiment, a lite program is installed on the client computers and concentrates the set of communication functionalities. The user can thus transmit to the device 10 for visual sharing of data a capture of an instantaneous image of the contents of his screen by a simple click on a button, or a capture of an instantaneous image of a file stored on his hard disk by dragging and dropping the icon of this file on that of the sharing program.

Advantageously, such a solution makes it possible to transmit any type of information that can be read by the source computer 20 on which is carried out the capture of an instantaneous image, and not necessarily in its native form on the device 10, and accelerates the transfer of information and the fluidity of the meeting by avoiding storing the information temporarily on a mass storage peripheral, which can nevertheless always be used.

It is important to emphasize the instantaneous nature of the captures used by the method and the device 10 for visual sharing of data.

In contrast to methods of collaborative work in which data to be shared are synchronized in real time between a computer and a sharing device, this invention makes it possible to facilitate and to automate, by means of a simplified interface, the sharing of data in the state where they are displayed at a precise moment on the computer 20 of a user who desires to share data.

The sharing can then be repeated as many times as necessary during a collaborative work meeting.

Thus, a user can modify the data to be shared on his computer during the meeting and along the way can share with the other users the modifications that are made, as he would do by printing out his data with each new modification.

In one mode of operation, the display of instantaneous images on the device 10 of the screen of a computer or a terminal comprising a connected computer is produced in a continuous manner at enough of a refresh rate to be perceived as a real-time copying over onto the screen of the terminal.

The fact of providing this operation of the sharing device 10 around captures of instantaneous images makes it possible to limit the use of the bandwidth of the local network, to increase the number of users that can share data simultaneously, and to improve the speed of sharing data.

In a general manner, this operation based on the transmission of captures of instantaneous images makes it possible to improve the flexibility of sharing data, with the data being shared on a single surface 22 and being usable by all of the users.

This flexibility of the sharing of data also maintains the ergonomy of the touch interface being displayed on the touch screen 12 and making it possible for the users to manipulate the shared data.

Actually, following the sharing method according to the invention provides that each tag (48, 48-1, 48-2) displayed on the touch screen 12 can be manipulated via the touch screen.

FIGS. 4 to 7 illustrate several examples of manipulations of tags 48 allowed by the touch screen 12 with a preferred touch interface.

Figure 4:
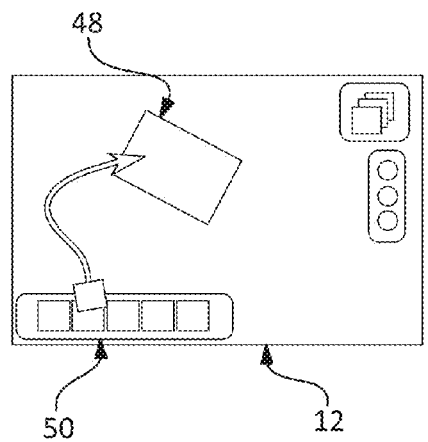

As FIG. 4 illustrates, the preferred touch interface comprises a virtual library 50 of data to be shared taking the form of a first banner that displays reduced versions of tags corresponding to various captures of instantaneous images made and shared by the connected computers, for example during a work session.

Hereinafter, an operation of the drag-and-drop type from this library 50 to a desired position of the screen makes it possible to create a tag 48 that can be exploited on the work space offered by the surface 22 of the touch screen 12.

In a preferred embodiment, filters can also be associated with this library 50 to temporarily select the contents that are displayed there and to facilitate the search for information.

Figure 5:
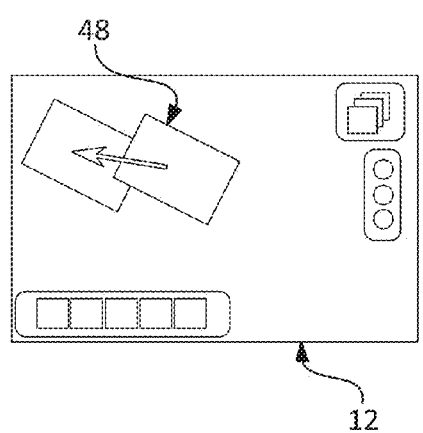

As illustrated in FIG. 5, the preferred touch interface makes it possible to move a tag 48, for example to position it in front of a user in particular.

Figure 6:
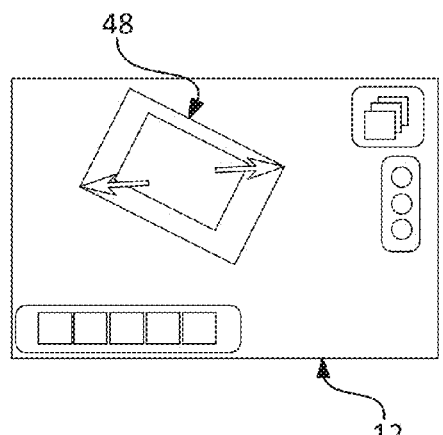
Figure 7:
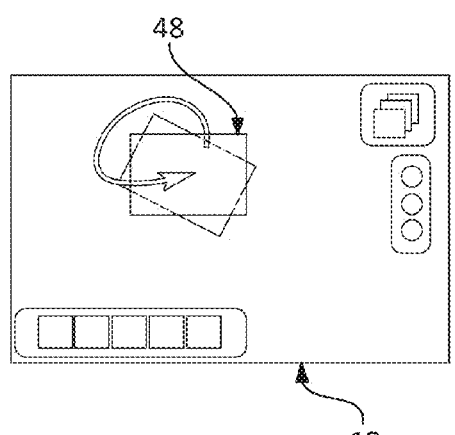

As illustrated in FIG. 6, the touch interface also makes it possible to resize a tag 48, to make it smaller or larger, or to make it pivot, as FIG. 7 illustrates, to orient it correctly in front of a user in particular or to position it beside other supplemental contents.

Advantageously, in contrast to known solutions, the sharing and the manipulation of data are done in an intuitive manner in such a way that these operations appear natural to the user and they are easily integrated within his work process.

The actions identified above on the tags are nonlimiting examples, and one skilled in the art can use the touch interface for more possibilities of action on the tags 48.

For example, the interface can also make it possible to duplicate a tag so that each user has the same tag available, as paper photocopies would allow, or to eliminate a tag, for example by making it leave the work space offered by the surface 22 of the touch screen 12, etc.

These manipulations of the tags (48, 48-1, 48-2) can be carried out by touch actions, such as a double tap or sliding of the fingers, or by virtual buttons 52, for example hooked on each tag, or by virtual buttons 54 that are independent and displayed permanently in the work space offered by the surface 22 of the touch screen 12.

An archiving window 56 can also be provided in which the shared data can be backed up, for example by a drag and drop, during a collaborative work meeting and in the form of tags, or screen captures of some or all of the contents of the touch screen 12.

The shared data that are thus moved to the archiving window 56, comprising the instantaneous images transmitted to the device 10 and the associated annotations made by means of the device during the meeting, are advantageously used for the automatic or assisted generation of a meeting report.

Advantageously, the connection means are being [sic] bi-directional.

The captures of instantaneous images on the device 10 can also be sent to at least one of the computers or terminals comprising a computer connected to the device, thus making it possible to construct a report during a meeting.

According to an advantageous functionality and facilitating the exchanges between the users, the sharing method makes it possible, via the touch screen 12, to link at least one tag 48-1 to at least one other tag 48-2 in such a way that manipulations performed on one of the tags, for example annotations, are reflected in real time on the other tag(s).

Thus, it is possible that each user has a tag that is duplicated in front of him on which he follows the manipulations performed by another user on another tag.

According to an improved functionality of the sharing of data, the sharing method can also provide that the contents of each tag 48 displayed on the touch screen 12 can be manipulated via the touch screen 12.

For example, the touch interface can provide virtual control buttons based on the contents of each tag.

Thus, the touch interface can offer the usual commands for reading a video file or can make it possible to move a virtual object into a virtual environment in two or three dimensions, to highlight a zone of the contents of a tag, or to launch animations, etc.

Advantageously, by combining the manipulation of the contents with the linking of tags, the contents of a duplicated tag in front of various users can be manipulated directly by the user sharing his data, based on the requirements of his presentation.

For example, the highlighting function associated with the linking of the tags can be used to provide precise explanations on the contents of a tag.

Figure 8:
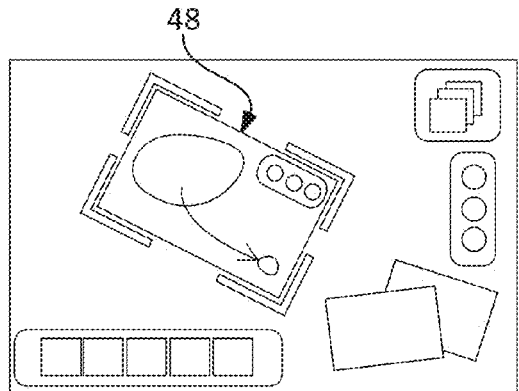
Figure 9:
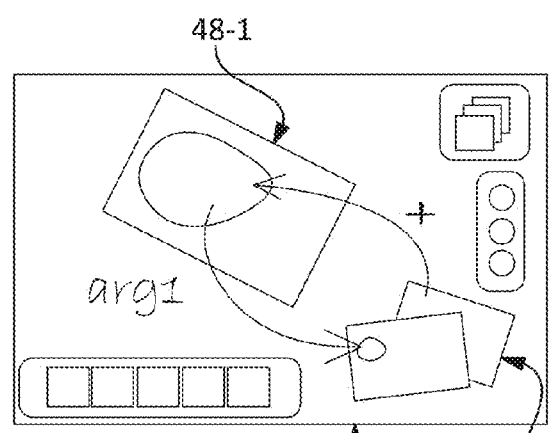

According to another functionality whose purpose is to improve the exchanges between users, the method for visual sharing of data provides that a tag 48 or a group of tags (48-1, 48-2, 48-3) can be annotated by supplemental data via the touch screen 12, as FIGS. 8 and 9 illustrate respectively.

These annotations can be carried out by a user by touch, or by using an electronic stylus 46 offering more precision, on the tag(s) or close to the latter.

Advantageously, by combining the annotation with the linking of the tags, various users can observe directly the annotations produced by each individual on the contents of one tag or of several tags duplicated in front of each of them.

When the sharing device 10 comprises physical buttons (36, 38), advantageously some or all of the overall contents of the touch screen 12 can be manipulated via these physical buttons (36, 38).

Figure 10:
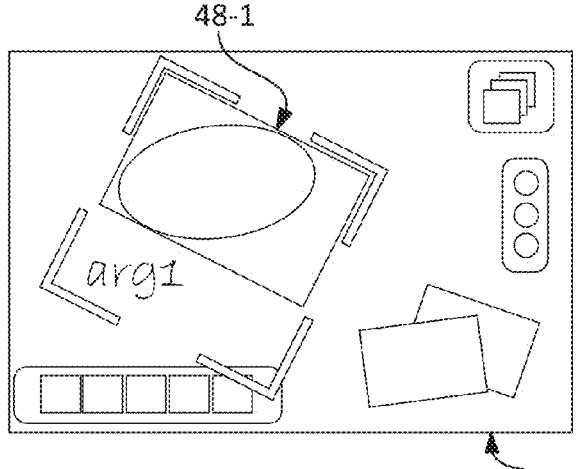

For example, the physical buttons (36, 38) make it possible to carry out actions such as the elimination or the back-up of all or part of the overall contents of the touch screen 12, for example by a capture of a tag by itself as illustrated by the frames in FIG. 8 or a tag and an annotation as illustrated by the frames in FIG. 10, or to launch the functionalities of annotation, duplication, and linking, etc.

In one preferred embodiment, one of the functions ensured by at least one of the physical buttons (36, 38) is to block some or all of the interpretations of some or all of the interactions on some or all of the touch screen 12. In this way, advantageously, at least a portion of the users can touch, highlight, indicate, show the contents that are present on the touch screen 12 without triggering interactions with these contents.

In a general manner, the sharing method advantageously provides that some or all of the overall contents of the touch screen 12 can also be manipulated by the virtual buttons 54 to carry out the same actions as those produced with the physical buttons (36, 38), or to carry out supplemental actions.

Thus, a virtual button displayed on the touch screen 12 can also make it possible to block some or all of the interpretations of some or all of the interactions on some or all of the touch screen 12.

The zone that said virtual button occupies on the screen preferably preserves some or all of its interactive nature.

For example, the physical buttons (36, 38) or the virtual buttons 54 make it possible to back up a tag 48, a group of tags (48-1, 48-2, 48-3), and/or some or all of the overall contents of the touch screen 12 regularly in the storage means of the sharing device 10 during a collaborative work meeting.

Advantageously, supplemental data, such as a date-time stamp or a date of the last modification, can be added to the backed-up data, for example in the form of "tags."

The method of backing up a tag 48, a group of tags (48-1, 48-2, 48-3), and/or some or all of the overall contents of the touch screen 12 can also be automated.

Preferably, following the sharing method, the backed-up elements can be exported via the sensors 42 for the connection of external mass storage peripherals, in particular for the purpose of producing a report of the meeting or an archiving.

The research leading to these results benefitted from financial support of the seventh program-framework of the European Union (7$^{th}$ PC/2007-2013) by virtue of Agreement No. 242411.

The invention claimed is:

1. An assembly that comprises:
a device (10) for visual sharing of data; and
at least one computer or a terminal incorporating a computer (20),
wherein the device (10) for visual sharing of data comprises processing means, data storage means, a touch screen (12), network connection means allowing a connection with the at least one computer or terminal incorporating a computer (20), a frame (16) with at least one flange (18) that is adjacent to the touch screen (12) and on which can be placed the at least one computer or terminal incorporating a computer (20) without the at least one computer or terminal incorporating a computer (20) infringing upon a surface (22) of the touch screen, with the at least one computer or terminals incorporating a computer (20) being connected to the network to which the device (10) for visual sharing of data belongs,
wherein the at least one computer or terminal incorporating a computer (20) comprises a client software, active when said at least one computer or terminal incorporating a computer (20) is connected by the network to the device (10) for visual sharing of data,
said client software comprising a series of instructions, which implements transmission via the network to the device (10) for visual sharing of data of an instantaneous image that is a representation of data, in text form or in graphic form, of the interpretation of said data, of at least some of the screen (14) of the at least one computer or terminal incorporating a computer (20) following a predefined action of capture on said at least one computer or terminal incorporating a computer (20), and
wherein the device (10) for visual sharing of data comprises software implementing storage of the instantaneous image transmitted by the at least one computer or terminal incorporating a computer (20) and jointly the display on the touch screen (12) of at least one tag of the stored instantaneous image, with said software comprising an assembly of logic units comprising a capacity of interpreting actions of an operator on the surface (22) of the touch screen for acting on the displayed tag.

2. The assembly according to claim 1, wherein the capture of the instantaneous image produced on the at least one computer or terminal incorporating a computer (20) comprises metadata that are predefined in the client software resident on said at least one computer or terminal incorporating a computer, following a parameterization or an acquisition of data by the user of the at least one computer or terminal incorporating a computer (20), associated with the image and transmitted to the device (10) for visual sharing of data with said captured instantaneous image.

3. The assembly according to claim 1, wherein the displayed actions on a tag comprise at least one of the group consisting of:
reducing a tag to an icon and displaying the instantaneous image corresponding to a tag,
manipulating said instantaneous image,
duplicating said instantaneous image,
combining a number of instantaneous images received,
enhancing said instantaneous image; annotating said instantaneous image,
archiving said instantaneous image, and
returning said instantaneous image to one or more computers connected in the network with the device (10) for visual sharing of data.

4. The assembly according to claim 1, wherein the processing means are configured so that an action on at least one of the group consisting of i) a virtual button (52) displayed on the touch screen (12) and ii) a physical button (36, 38), has an effect of blocking at least some interpretations of at least some interactions of an operator on at least some of the touch screen (12).

5. An assembly that comprises:
a device (10) for visual sharing of data; and
at least one computer or a terminal incorporating a computer (20),
wherein the device (10) for visual sharing of data comprises processing means, data storage means, a touch screen (12), network connection means allowing a connection with the at least one computer or terminal incorporating a computer (20), a frame (16) with at least one flange (18) that is adjacent to the touch screen (12) and on which can be placed the at least one computer or terminal incorporating a computer (20) without the at least one computer or terminal incorporating a computer infringing upon a surface (22) of the touch screen, with the at least one computer or terminals incorporating a computer (20) being connected to the network to which the device (10) for visual sharing of data belongs,
wherein the at least one computer or terminal incorporating a computer (20) comprises a client software, active when said at least one computer or terminal incorporating a computer (20) is connected by the network to the device (10) for visual sharing of data,
said client software comprising a series of instructions, which implements transmission via the network to the device (10) for visual sharing of data of an instantaneous image that is a representation of data, in text form or in graphic form, of the interpretation of said data, of at least some of a screen (14) of the at least one computer or terminal incorporating a computer (20) following a predefined action of capture on said at least one computer or terminal incorporating a computer (20), and
wherein the device (10) for visual sharing of data comprises software implementing storage of the instantaneous image transmitted by the at least one computer or terminal incorporating a computer (20) and jointly the display on the touch screen (12) of at least one tag of the stored instantaneous image, with said software comprising an assembly of logic units comprising a capacity of interpreting actions of an operator on the surface (22) of the touch screen for acting on the displayed tag,
wherein the at least one flange (18) of the device (10) for visual sharing of data integrates physical buttons (36) making it possible for the user to act on the data displayed on the touch screen (12).

6. The assembly according to claim 1, wherein the frame (16) of the device (10) for visual sharing is arranged in the form of a desk into which is integrated the touch screen (12) between four flanges forming a frame with said touch screen,
wherein said frame has a width that is greater than or equal to twenty centimeters, and wherein said frame comprises at least one of the group consisting of i) sensors (42) for the connection to the local network and ii) sensors for power supply for the at least one computer or terminal incorporating a computer (20).

7. The assembly according to claim 1, wherein the processing means are configured so that an action on at least one of the group consisting of i) a virtual button (52) displayed on the touch screen (12) and ii) a physical button (36, 38), has the result of producing
   a) a capture of an instantaneous image of data that are at least one of the group i) interpreted on the touch screen (12) and ii) displayed on the touch screen (12), and
   b) backing up said capture in the data storage means.

8. A method for visual sharing of data, wherein data that have to be shared between plural individuals are displayed on a touch screen (12) of a device (10) for visual sharing of data starting from data contained in at least one computer or a terminal incorporating a computer (20), the method for visual sharing of data comprising:
   a preliminary stage of connecting the at least one computer or terminal incorporating a computer, including a recognition stage of said computer or terminal incorporating a computer, with the device (10) for visual sharing of data and display on a screen (14) of said at least one computer or terminal incorporating a computer of data to be shared, followed by the steps of:
   carrying out a capture of the data to be shared that are present on the connected at least one computer or terminal incorporating a computer (20), in the form of an instantaneous image of at least part of the screen of said at least one computer or terminal incorporating a computer;
   transmitting via the at least one computer or terminal incorporating a computer (20), consequently to a predefined action of capture the instantaneous image of data captured with the device (10) for visual sharing of data via a network connection means of the device (10) for visual sharing of data;
   storing said instantaneous image in the device (10) for visual sharing of data;
   displaying at least one tag (48, 48-1, 48-2) on the touch screen (12) that materializes said instantaneous image on said touch screen (12) of said device (10) for visual sharing of data; and
   interpreting actions on a surface of said touch screen as actions on said displayed at least one tag.

9. The method for visual sharing of data according to claim 8, wherein the transmission by the at least one computer or terminal incorporating a computer (20) is triggered by one of the group consisting of
   i) at least one click on a virtual button of a client software resident on said computer or terminal incorporating a computer, and
   ii) by a drag and drop of a file in a send window of said client software.

10. The method for visual sharing of data according to claim 8, wherein a two-dimensional image or a three-dimensional image is displayed on the touch screen (12) when the instantaneous image that is transmitted by the at least one computer or terminal incorporating a computer (20) corresponds to digital data of a two-dimensional image or a three dimensional image.

11. The method for visual sharing of data according to claim 8, wherein the device (10) for visual sharing of data transmits an instantaneous image of data that is captured on said device for visual sharing of data, via the network connection means, to the at least one computer or terminal incorporating a computer (20), connected to said network, by at least one of the group consisting of:
   i) one click on a tag displayed on the touch screen (12) and identifying said at least one computer or terminal incorporating a computer, and
   ii) by a drag and drop of a file in said tag.

12. The method for visual sharing of data according to claim 11, wherein when an instantaneous image is shown two or more times by tags displayed on the touch screen (12), at least some of the interpretations, made by the device (10) for visual sharing of data on one of said tags, of actions of an operator are reflected on all of the other said tags.

13. The method for visual sharing of data according to claim 8, wherein the contents of each tag (48, 48-1, 48-2, 48-3) displayed on the touch screen can be manipulated via the touch screen (12).

14. The method for visual sharing of data according to claim 8, wherein a tag (48) or a group of tags (48-1, 48-2, 48-3) can be annotated via the touch screen (12).

15. The method for visual sharing of data according to claim 8, wherein the device (10) for visual sharing of data comprises physical buttons (36, 38), some or all of the overall contents of the touch screen (12) can be manipulated via the physical buttons (36, 38).

16. The method for visual sharing of data according to claim 8, wherein the device (10) for visual sharing of data includes storage means, and the storage means of said device (10) for visual sharing of data stores back-ups of at least some of the images of the touch screen (12), said back-ups being made in accordance with at least one of the group consisting of i) periodically at a defined time interval, ii) with each action concurrent with an enhancement of information contained in an instantaneous image, iii) on an action of an operator on a virtual button or a real button.

17. The assembly according to claim 1, wherein the device (10) for visual sharing of data comprises at least one physical button (36, 38) connected to the processing means and making it possible for a user to act on the data displayed on the touch screen (12).

18. The method for visual sharing of data according to claim 9, wherein a two-dimensional image or a three-dimensional image is displayed on the touch screen (12) when the instantaneous image that is transmitted by the computer or terminal incorporating a computer (20) corresponds to digital data of a two-dimensional image or a three dimensional image.

19. The assembly according to claim 7, wherein the processing means are configured so that instantaneous images of data captured on the touch screen (12) and backed up in the data storage means are accessible by an archiving window (56) that is displayed on the touch screen (12).

20. The assembly according to claim 1, wherein the processing means are configured so that an action on at least one of the group consisting of i) a virtual button (52) displayed on the touch screen (12) and ii) a physical button (36, 38), has a result of activating annotation functions on at least some of the touch screen (12).

* * * * *